United States Patent [19]

Yoshida

[11] Patent Number: 4,811,673
[45] Date of Patent: Mar. 14, 1989

[54] INFORMATION DISPLAY FOR A ZIGZAG SEWING MACHINE

[75] Inventor: Noriyuki Yoshida, Nagoya, Japan

[73] Assignee: Brother Kogyo Kabushiki Kaisha, Aichi, Japan

[21] Appl. No.: 82,597

[22] Filed: Aug. 7, 1987

[30] Foreign Application Priority Data

Aug. 9, 1986 [JP] Japan .................. 61-187544

[51] Int. Cl.⁴ .............................. D05B 3/02
[52] U.S. Cl. .................. 112/445; 112/456; 112/458
[58] Field of Search ............ 112/445, 453, 454, 456, 112/457, 458, 121.11, 121.12

[56] References Cited

U.S. PATENT DOCUMENTS

| | | | |
|---|---|---|---|
| 4,236,467 | 12/1980 | Tanaka et al. | 112/445 |
| 4,422,394 | 12/1983 | Bergvall | 112/445 |
| 4,499,836 | 2/1985 | Meier et al. | 112/445 |
| 4,512,271 | 4/1985 | Herdeg et al. | 112/445 |
| 4,651,663 | 3/1987 | Murakami et al. | 112/456 X |

Primary Examiner—Peter Nerbun
Attorney, Agent, or Firm—Barnes & Thornburg

[57] ABSTRACT

Optimum sewing machine setting values for a plurality of stitch patterns to be adjusted by adjusting means, and display information data of messages explaining at least either the manner of sewing operation for the stitch patterns or methods of forming the stitch patterns are stored in a memory at addresses respectively corresponding to the stitch patterns. Relevant setting values are displayed when a stitch pattern is selected on a display unit and the indication of the setting values is changed for the indication of a message when a changeover member is operated.

6 Claims, 7 Drawing Sheets

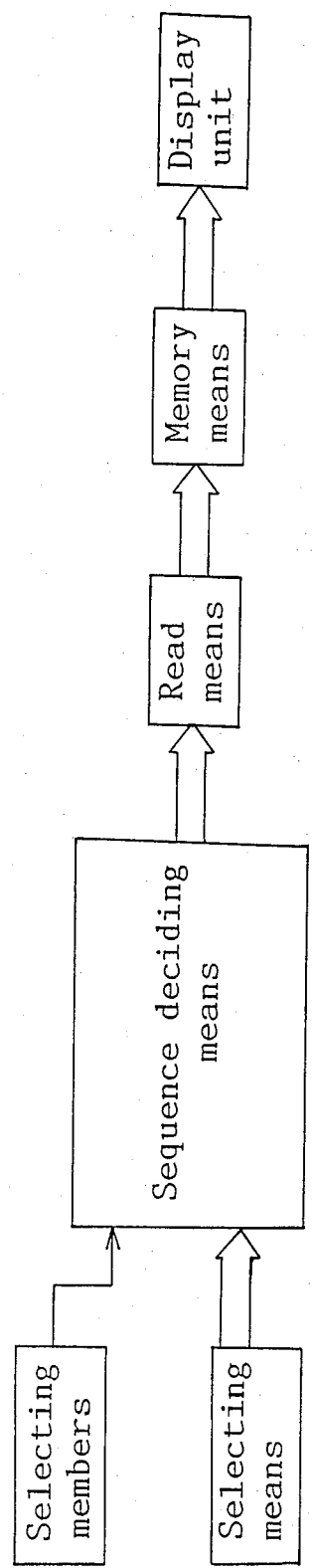

INFORMATION DISPLAY FOR A ZIGZAG SEWING MACHINE

BACKGROUND OF THE INVENTION

The present invention relates to an information display for a zigzag sewing machine and, more specifically, to an information display for a zigzag sewing machine, to simplify preparatory operation for setting the zigzag sewing machine for sewing a selected stitch pattern.

An information display of this kind is disclosed in U.S. Pat. No. 4,236,467. This known information display displays various optimum adjustment data and an optimum presser foot for forming the selected stitch pattern on the display unit thereof. While the selected stitch pattern is being formed, the adjustment data and the presser foot are indicated by numerals and symbols on the display unit.

However, the mere display of the adjustment data and sewing tools does not provide sufficient information for satisfactorily forming the selected stitch pattern. An unskilled operator, in particular, needs to be informed sufficiently of the contents of the sewing operation and methods of manipulating the sewing tools before starting the sewing operation. Therefore, the unskilled operator is obliged to consult a sewing machine operating manual for information every time before starting the sewing operation, which deteriorates the accessibility of the sewing machine.

A method of providing sewing information to eliminate such an inconvenience has been proposed. According to this proposed method, a table of information formed by simplifying or abbreviating the contents of the operating manual is attached to the inner surface of the cover of the sewing machine to enable the operator to consult the instructions provided in the table. However, the inner surface of the cover has only a limited area, and hence the information and instructions are tabulated in very small characters and figures which are difficult to recognize.

SUMMARY OF THE INVENTION

Accordingly, it is a principal object of the present invention to provide an information display for a zigzag sewing machine, for simplifying preparatory operation for sewing a selected stitch pattern.

It is another object of the present invention to provide an information display for a zigzag sewing machine, capable of displaying a plurality of data necessary for forming a stitch pattern in order of preference on a character display unit provided in the front side of the zigzag sewing machine.

It is a further object of the present invention to provide an information display for a zigzag sewing machine, capable of displaying optimum set values for the control means for forming a selected stitch pattern and a message explaining at least either conditions for sewing operation for forming the pattern or a method of forming the pattern on a single character display unit provided in the front side of the zigzag sewing machine.

To achieve the foregoing objects of the invention, as illustrated in FIG. 9, in a zigzag sewing machine provided with a frame, a feed mechanism supported in the frame for selectively feeding a work, a needle bar with a needle supported in said frame so as to be capable of endwise reciprocating and selectively laterally jogging, selecting means including selecting members to be operated for selecting a desired stitch pattern among a plurality of predetermined stitch patterns, and adjusting means which sets at least either the amplitude of the needle for forming the selected stitch pattern or the feed of the feed mechanism for forming the selected stitch pattern, and being capable of forming the stitch pattern according to sewing conditions adjusted by the adjusting means, an information display according to the present invention comprises; a display unit provided in the front side of the frame of the zigzag sewing machine; memory means which stores display information data to display optimum set values for each stitch pattern to be adjusted by the adjusting means, and messages explaining at least either sewing operation for forming each stitch pattern or a method of forming each stitch pattern; a read means which reads display information data for a selected stitch pattern from the memory means according to a code signal corresponding to the stitch pattern selected by the selecting means; a changeover member for changing the information displayed on the display unit, provided in the front side of the frame; sequence deciding means which decides the sequence of feeding a first data for displaying set values in selecting a stitch pattern and a second data for displaying the messages, supplies the first data in response to the operation of the selecting members, and supplies the second data in response to the operation of the changeover member.

According to the present invention, upon the selection of a stitch pattern by the selecting means, the sequence deciding means feeds the first data to the display unit to make the display unit display optimum set values for the selected stitch pattern. When the changeover member is operated, the sequence deciding means feeds the second data to the display unit to make the display unit display messages relating to the selected stitch pattern.

Preferably, the sequence deciding means controls the read means according to the operation of the selecting member or the changeover member so as to read either the first data or the second data from the memory means.

Preferably, the memory means stores display information data to display identities for each stitch pattern to be selected by the selecting means, and messages explaining at least either sewing operation for forming each stitch pattern or a method of forming each stitch pattern. And, sequence deciding means decides the sequence of supplying the first data for displaying the identity in selecting a stitch pattern and the second data for displaying the messages, and supplies these first and second data same as above-described.

Preferably, the zigzag sewing machine further includes bobbin winding means for winding a bobbin thread on a bobbin. And the information display further includes detector means for detecting an operative position of the bobbin winding means and generating a bobbin winding signal. The memory means further stores display information data to display the bobbin winding means operation. The read means further reads display information data for the bobbin winding means operation from the memory means according to the bobbin winding signal. And the sequence deciding means further supplies the display information data for displaying the bobbin winding means operation, while the detector means detects the operative position of the bobbin winding means.

Thus, according to the present invention, a plurality of information data necessary for forming each of a plurality of stitch patterns on the display unit provided in the front side of the sewing machine. Accordingly, it is necessary to provide a plurality of display units of a number corresponding to the number of kinds of information in the front side of the frame of the sewing machine, and hence freedom of arrangement of switches in the front side of the frame of the sewing machine is enhanced.

Furthermore, according to the present invention, when a stitch pattern is selected, at least either an optimum set value for the amplitude of the swing motion of the needle or an optimum set value for the feed of the feed mechanism is displayed on the display unit. Then, when the changeover member is operated, a message explaining at least either the sewing operation for forming the selected stitch pattern or a method of forming the selected stitch pattern is displayed on the display unit. Accordingly, the sewing operation can be started without displaying messages which are not necessarily required by a skilled operator on the display unit and, on the other hand, messages can fully be displayed on the display unit for an unskilled operator or an operator who is inexperienced with the sewing machine so that the operator is able to form the selected stitch pattern satisfactorily without consulting the operating manual for the sewing machine.

BRIEF DESCRIPTION OF THE DRAWINGS

FIG. 9 is a block diagram showing the constitution of the information display incorporated into the zigzag sewing machine of FIG. 1.

DESCRIPTION OF THE PREFERRED EMBODIMENT

An information display, in a preferred embodiment, according to the present invention will be described hereinafter with reference to the accompanying drawings.

Figure 2:
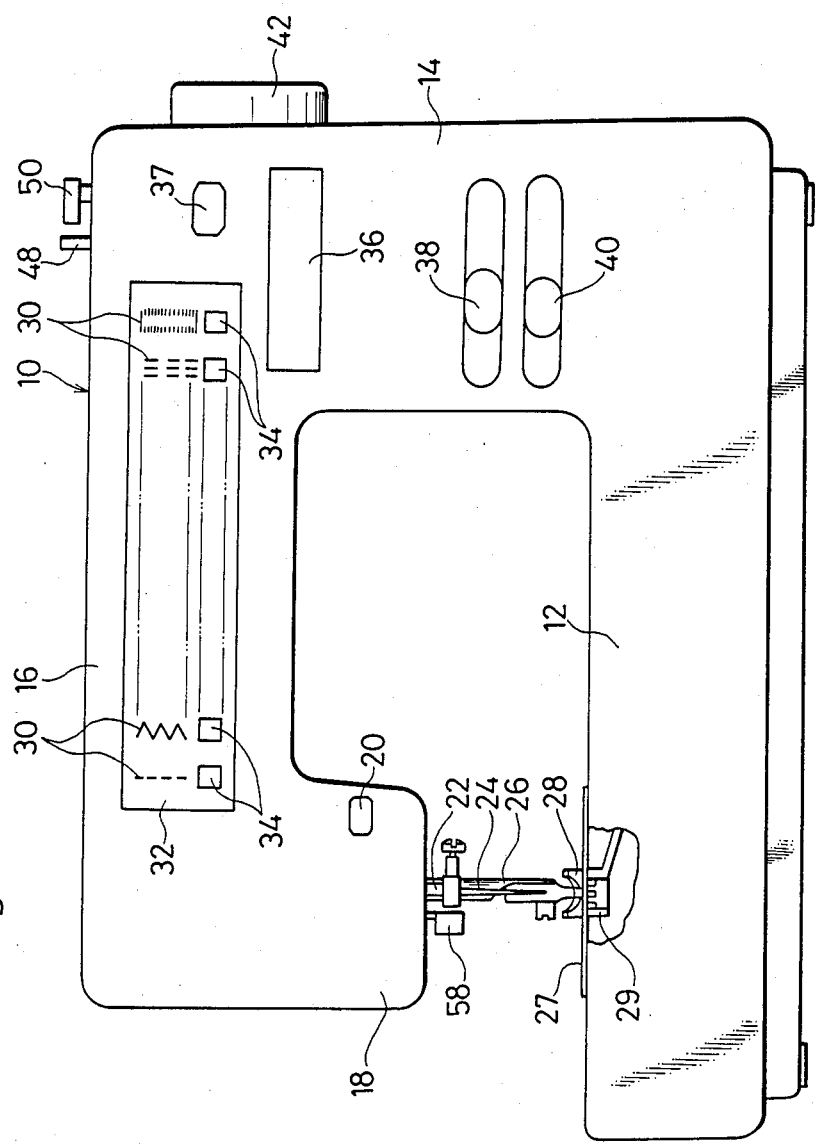
FIG. 2 is a front elevation of FIG. 1.

Referring to FIG. 2 illustrating a sewing machine incorporating an information display embodying the present invention, the sewing machine includes a frame 10 having a bed 12, a standard 14 and an upper arm 16 horizontally extending from the standard 14, overhanging the bed 12 and terminating in a head 18. A main switch 20 for starting and stopping the sewing machine is provided in the front side of the head 18. Supported in the head 18 for vertical reciprocating motion and lateral swing motion is a needle bar 22 carrying a needle 24 at the lower end thereof. Supported in the head 18 behind the needle bar 22 for vertical movement is a presser bar 26 carrying a presser foot 28 at the lower end thereof. A feed dog 29 which cooperates with the presser foot 28 to feed a work is provided in the bed 12 so as to project upward and to retract downward through a plurality of slots formed in a throat plate 27.

Provided in the front side of the upper arm 16 is a display plate 32 displaying a plurality of symbols 30 representing stitch patterns which can be formed by the sewing machine, and a plurality of stitch pattern selector switches 34 respectively corresponding to the symbols 30. Further provided in the front side of the upper arm 16 are a character display unit 36 for displaying necessary information, and a changeover switch 37 for changing the contents of display on the character display unit 36.

Provided in the front side of the standard 14 are a swing stroke adjusting member 38 for adjusting the amplitude of swing motion of the needle bar 24, and a feed stroke adjusting member 40 for adjusting the feed stroke of the feed dog 29. A hand pulley 42 operatively connected to a main shaft 41 (FIG. 3) is supported rotatably in the lateral side of the standard 14.

Figure 3:
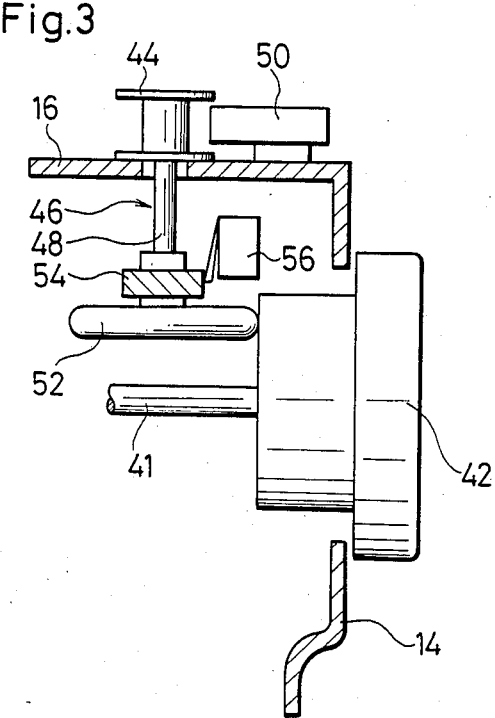
FIG. 3 is a fragmentary sectional view showing a thread winding device incorporated into the zigzag sewing machine of FIG. 1.

Referring to FIG. 3, interlocked with the hand pulley 42 is a bobbin winding device 46 of a publicly known construction for winding a bobbin thread on a bobbin 44. The bobbin winding device 46 has a bobbin winder spindle 48 for supporting the bobbin 44, a bobbin presser 50 for limiting the amount of bobbin thread to be wound on the bobbin 44, a driven pulley 52 attached to the lower end of the bobbin winder spindle 48, a bracket 54 supporting the bobbin winder spindle 48, and a bobbin spindle detector 56, namely, a two-position switch, for detecting the completion of a bobbin winding cycle. When the bobbin thread is wound by a predetermined amount on the bobbin 44, the driven pulley 52 is separated from the hand pulley 42 to stop the bobbin winder spindle 48.

Figure 4:
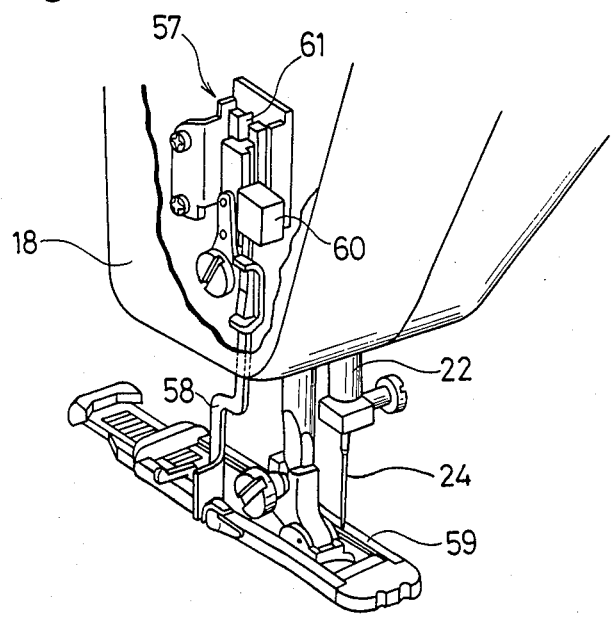
FIG. 4 is a perspective view showing a button hole detecting device incorporated into the zigzag sewing machine of FIG. 1.

The sewing machine is provided further with a publicly known buttonhole detecting device 57 as shown in FIG. 4 for deciding the length of a buttonhole to be formed. The buttonhole detecting device 57 has a detecting bar 58 capable of being moved vertically for detecting the length of a buttonhole in cooperation with a buttonholing presser foot 59, which is attached to the presser bar 26 for buttonhole stitching instead of the ordinary presser foot for single line stitching, and a detecting switch 61 which is operated by the detecting bar 58. Fixedly provided in the head 18 is a position detector 60 for detecting the downward shift of the detecting bar 58.

Figure 1:
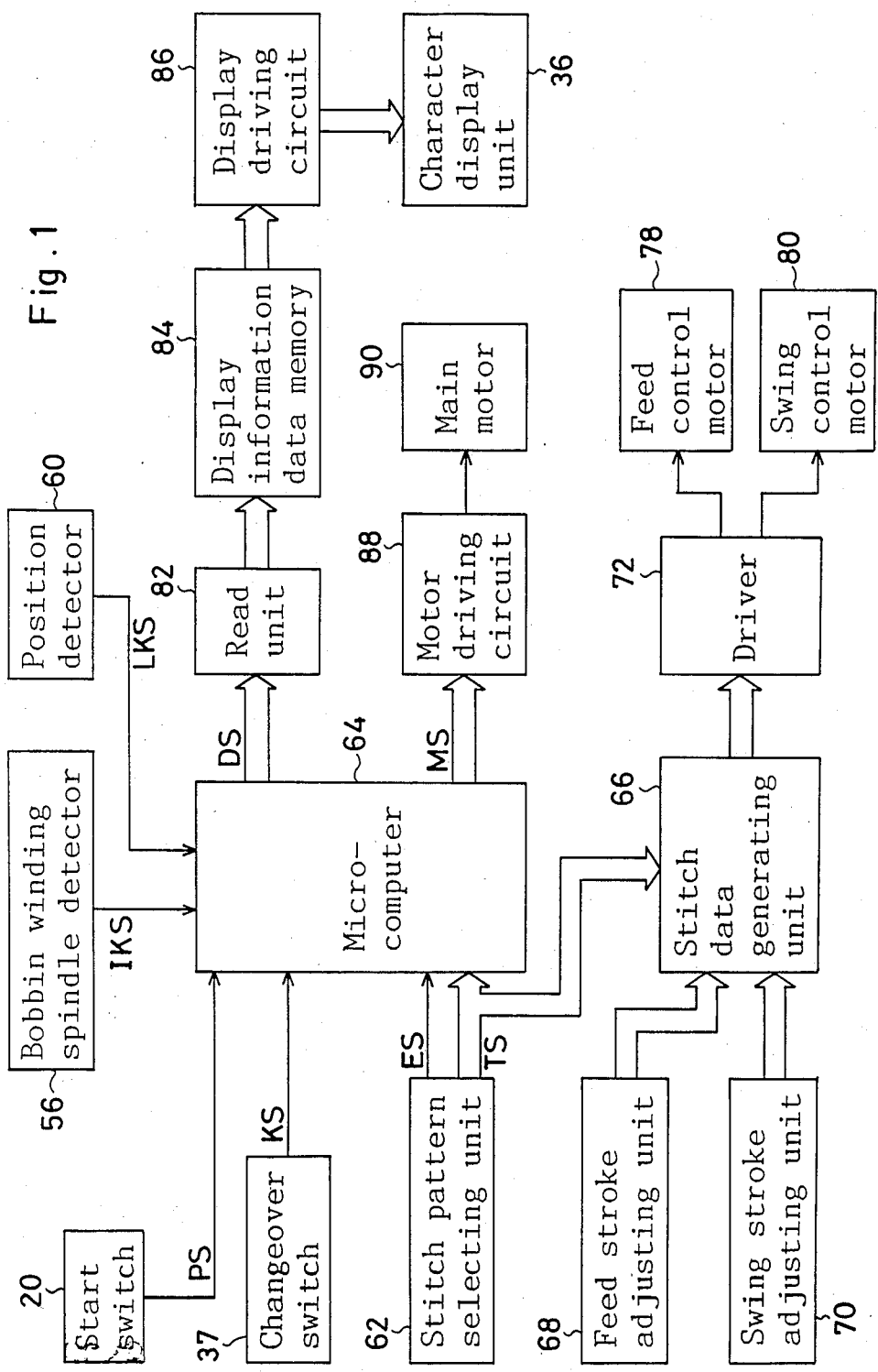
FIG. 1 is a block diagram showing the electrical constitution of a zigzag sewing machine incorporating an information display, in a preferred embodiment, according to the present invention.

The electrical constitution of the sewing machine will be described hereinafter with reference to FIG. 1.

A stitch pattern selecting unit 62, which corresponds to stitch pattern selecting means, includes the stitch pattern selecting switches 34 as selecting members. When the selecting switch 34 is operated, the stitch pattern selecting unit 62 gives a selection signal ES of high level to a microcomputer 64, and gives a stitch pattern code signal TS corresponding to the selected stitch pattern to the microcomputer 64 and to a stitch data generating unit 66.

A feed stroke adjusting unit 68 and a swing stroke adjusting unit 70, which correspond to adjusting means, are connected to the stitch data generating unit 66. The feed stroke adjusting unit 68 gives feed adjustment data selected by the feed stroke adjusting member 40 to the stitch data generating unit 66, while the swing stroke adjusting unit 70 gives swing adjustment data selected by the swing stroke adjusting member 38 to the stitch data generating unit 66. The stitch data generating unit 66 includes a stitch pattern memory storing stitch data of a plurality of possible stitch patterns. Upon the reception of the stitch pattern code signal TS from the stitch pattern selecting unit 62, the stitch data generating unit 66 selects a stitch data corresponding to the selected stitch pattern among the stitch pattern data stored in the stitch pattern memory, modifies the selected stitch pattern data according to the feed stroke adjusting data given thereto from the feed stroke adjusting unit 68 and the swing stroke adjusting data given thereto from the swing stroke adjusting unit 70, and then gives a modified stitch pattern data to a driver 72. Then, the driver 72 controls at feed control motor 78 and a swing control motor 80 according to the stitch pattern data given thereto to regulate the feed stroke of the feed dog 29 and the swing stroke of the needle 24 so that the stitch pattern selected by means of the stitch pattern selecting switch 34 is formed.

The start switch 20 is connected to the microcomputer 64. When operated, the start switch 20 gives an operation signal PS of high level to the microcomputer 64. A bobbin winding spindle detector 56 connected to the microcomputer 64 detects the position of the bobbin winder spindle 48, and generates a bobbin winding signal IKS of high level (hereinafter denoted by "IKS-H") when the bobbin winder spindle 48 is at the operative position and a bobbin winding signal IKS of low level (hereinafter denoted by "IKS-L") when the bobbin winder spindle 48 is at the inoperative position. A detecting bar position detector 60 connected to the microcomputer 64 generates a bar position detection signal LKS of high level (hereinafter denoted by "LKS-H") when the detecting bar 58 is shifted from the head 18 to the lower operative position, and generates a bar position detection signal LKS of low level (hereinafter denoted by "LKS-L") when the detecting bar 58 is retracted from the operative position to the inoperative position in the head 18. The changeover switch 37 corresponding to the changeover member is an automatic reset switch. The changeover switch 37 gives a changeover signal KS of high level (hereinafter denoted by "KS-H") to the microcomputer 64 when the push-button thereof is pressed and gives a changeover signal KS of low level (hereinafter denoted by "KS-L") to the microcomputer 64 when the push-button thereof is released.

The microcomputer 64 corresponds to the display information data feeding sequence deciding means. Upon the reception of those input signals, the microcomputer 64 operates according to a control program, which will be described hereinafter, to give a display instruction signal DS to a read unit 82 corresponding to the read means and to give a motor control signal MS to a motor driving circuit 88.

The motor driving circuit 88 operates according to the motor control signal MS to drive or to stop the main motor 90.

The read unit 82 corresponds to the read means, the read unit 82 sequentially gives addressing signals corresponding to desired information data among those stored in a display information data memory 84 to the display information data memory 84 to read the desired information data according to a display instruction signal DS.

The display information data memory 84 is an electronic memory fixedly storing information data. The display information data memory 84 stores display information data such as information data representing the respective designations of stitch patterns, first display information data representing stitch pattern numbers, optimum swing strokes of the needle 24 and optimum feed strokes of the feed dog 29, second display information data representing messages explaining instructions for the preparatory operations for forming the stitch patterns or the respective purposes of the stitch patterns, display information data representing messages describing the bobbin winding operation when the bobbin winder spindle 48 is at the operative position, and information display data representing the abnormal state of the detecting bar 58, in which the detecting bar 58 is not lowered to the lower operative position when a buttonholing mode is selected. The display information data memory 84 gives display information data specified by the addressing signals given thereto from the read unit 82 to a display driving circuit 86.

The display driving circuit 86 displays values and messages according to the display information data given thereto from the display information data memory 84 on the character display unit 36.

The character display unit 36 is of a dot matrix type having a plurality of liquid crystal elements arranged at regular intervals in lines and rows. The voltage applied to each dot element is controlled to display sixteen characters, numerals and/or symbols at the maximum.

The manner of operation of the information display of the present invention thus constituted will be described hereinafter.

When the bobbin winder spindle 48 of the bobbin winding device 46 is at the inoperative position, the bobbin winding spindle detector 56 is generating a bobbin winding signal IKS-L, the detecting bar 58 of the button hole detecting device 57 is retracted into the head 18, and the position detector 60 is generating a bar position detection signal LKS-L while the sewing machine is stopped, the stitch pattern selecting switch 34 is operated to select a desired stitch pattern, for example, a zigzag stitch pattern, among the plurality of stitch patterns. Then, the stitch pattern selecting unit 62 gives a selection signal ES of high level to the microcomputer 64 and gives a stitch pattern code signal TS corresponding to the zigzag stitch pattern to both the microcomputer 64 and the stitch data generating unit 66.

Figure 5A:
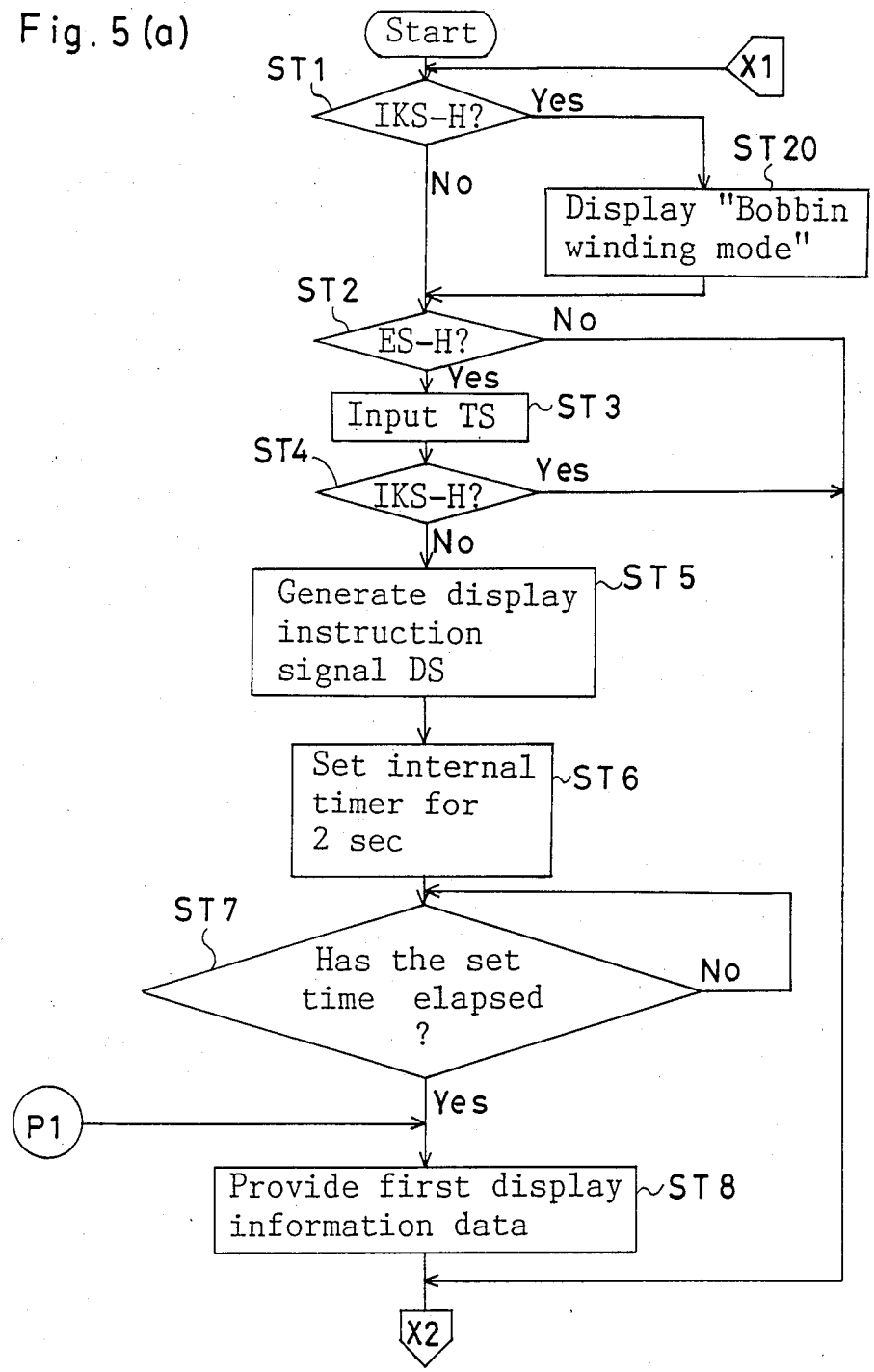
FIGS. 5 (a).(b) is a flow chart of a control routine to be executed by a microcomputer incorporated into the zigzag sewing machine of FIG. 1.
Figure 5:
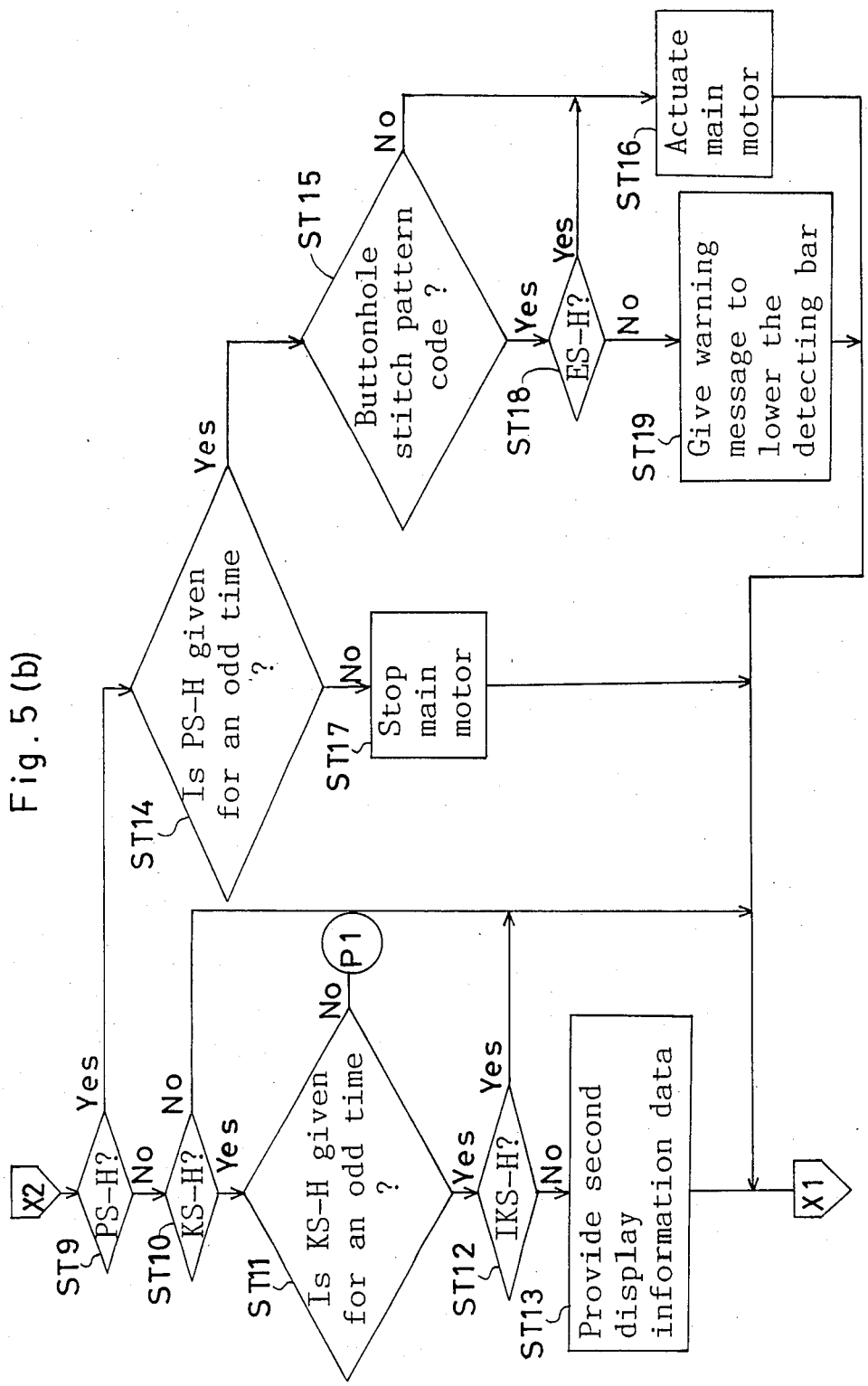
Figures 6, 7, 8:
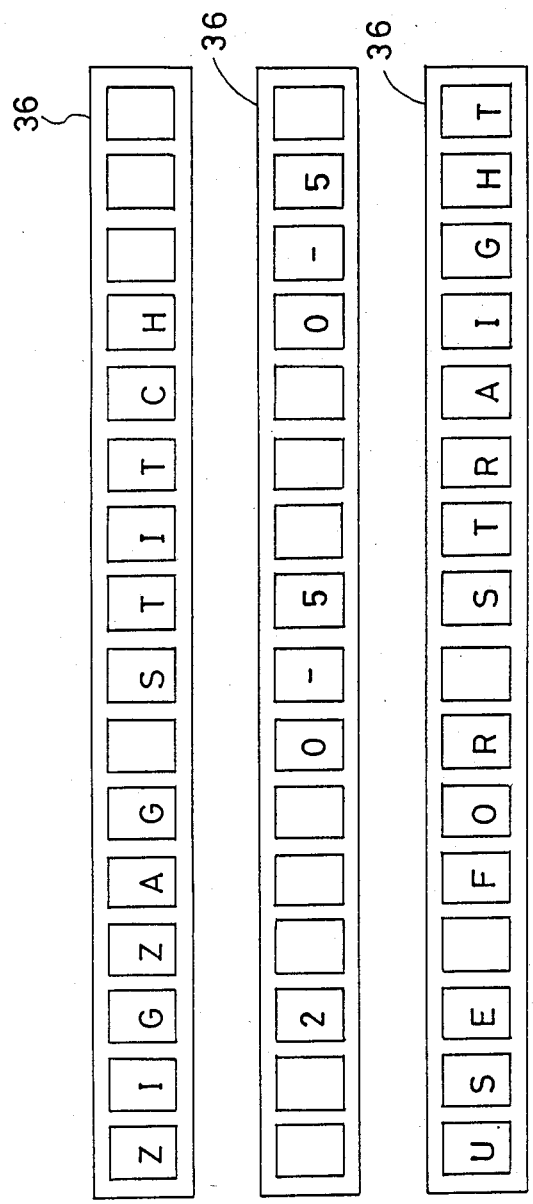
FIGS. 6, 7 and 8 are illustrations of exemplary indications on a character display unit provided in the zigzag sewing machine of FIG. 1.

Upon the reception of the selection signal ES of high level, the microcomputer 64 executes step ST1 of a control program shown in FIG. 5 to discriminate the level of the bobbin winding signal IKS, and then discriminates the level of the selection signal ES at step ST2. At step ST3, the microcomputer 64 receives the stitch pattern code signal TS representing the zigzag stitch pattern, makes a decision whether or not the bobbin winding signal IKS is of high level at step ST4, and then generates a display instruction signal DS at step ST5 to display the designation of the zigzag stitch pattern. Then, the read unit 82 gives an addressing signal corresponding to the display instruction signal DS to the display information data memory 84, the display information data memory 84 in turn gives a display information data representing the designation of the zigzag stitch pattern corresponding to the addressing signal to the display driving circuit 86, and then, the display driving circuit 86 drives the character display unit 36 to display the designation of the zigzag stitch pattern on the character display unit 36. FIG. 6 shows a character indication thus displayed on the character display unit 36.

After the designation of the zigzag stitch pattern has been displayed on the character display unit 36, the microcomputer 64 sets the internal timer thereof for two seconds at step ST6. At step ST7 a decision is made whether or not two seconds has elapsed. When the decision at step ST7 is "Yes", the microcomputer gives the display instruction signal DS to the read unit 82 to display stitch pattern number indicating the zigzag stitch pattern and set values appropriate for forming the zigzag stitch pattern. Then, the read unit 82 applies an addressing signal corresponding to the display instruction signal DS to the display information data memory 84. Then, the display information data memory 84 gives a first display information data including data for forming the zigzag stitch pattern according to the addressing signal to the display driving circuit 86. Then, the display driving circuit 86 changes the indication on the character display unit 36 from the designation of the zigzag stitch pattern to a stitch pattern number representing the zigzag stitch pattern, an optimum swing stroke and an optimum feed stroke for forming the zigzag stitch pattern as shown in FIG. 7. Shown in FIG. 7 from left to right are the stitch pattern number of the zigzag stitch pattern, the optimum swing stroke of the needle 24, and the optimum feed stroke of the feed dog 29. When the swing stroke adjusting member 38 and the feed stroke adjusting member 40 are operated with reference to the first display information data displayed on the character display unit 36, the swing stroke adjusting unit 70 and the feed stroke adjusting unit 68 give swing stroke adjusting data and feed stroke adjusting data, respectively, to the stitch data generating unit 66.

When the push-button of the changeover switch 37 is pressed, the microcomputer 64 makes a decision at step ST10 whether or not a changeover signal KS-H has been given and, when the decision at step ST10 is "Yes", the microcomputer 64 makes a decision at step ST11 whether or not changeover signal KS-H is given for the first time, namely, whether or not the changeover signal KS-H is given for a time of an odd ordinal number. At step ST12, the microcomputer 64 makes a decision, similarly to the decision at step ST1, whether or not the bobbin winding signal IKS is IKS-H. When the decision at step ST12 is "No", the microcomputer 64 gives a display instruction signal DS for displaying a message explaining the uses of the zigzag stitch patterns to the read unit 82.

Then, the read unit 82, the display information data memory 84 and the display driving circuit 86 operate according to the display instruction signal DS. Consequently, the message explaining the uses of the zigzag stitch pattern, such as "Use for straight hemming, patchwork and applique", is displayed on the character display unit 36. Since the display capacity of the character display unit 36 is sixteen characters, the first sixteen characters are displayed on the character display unit 36 as shown in FIG. 8, and then the indication is rolled from right to left to display the rest of the characters sequentially on the character display unit 36 when the message has more than sixteen characters.

When the push-button of the changeover switch 37 is pressed for the second time, the microcomputer 64 discriminates the level of the changeover signal KS at step ST10. When the changeover signal is a KS-H, the microcomputer executes step ST11 to decide whether or not the changeover signal KS-H is given for a time of an odd ordinal number. When the decision at step ST11 is "No", the routine returns to step ST8. Consequently, the stitch pattern number of the zigzag stitch pattern, the optimum swing stroke and the optimum feed stroke are displayed on the character display unit 36.

When the start switch 20 is closed, an operation signal PS-H is applied to the microcomputer 64. Then, the microcomputer 64 executes step ST9 to decide whether or not an operation signal PS-H is given. When the decision at step ST9 is "Yes", the microcomputer 64 makes a decision at step ST14 whether or not the operation signal PS-H is given for a time of an odd cardinal number. When the decision at step ST14 is "Yes", the microcomputer makes a decision at step ST15 whether or not the stitch pattern code signal PS represents a buttonhole stitch pattern. When the decision at step ST15 is "No", the microcomputer 64 executes step ST16 to give a motor control signal MS to the motor driving circuit 88 to actuate the main motor 90. Then, the motor driving circuit 88 actuates the main motor 90 in response to the motor control signal MS. As the needle 24 is driven for vertical reciprocation by the main motor 90, the stitch data of the zigzag stitch pattern corresponding to the stitch pattern code signal TS generated by the stitch data generating unit 66 is modified sequentially on the basis of adjusting data provided by the feed stroke adjusting unit 68 and the swing stroke adjusting unit 70, and then the modified stitch data is fed to the driver 72. The driver 72 drives the feed control motor 78 and the swing control motor 80 according to the stitch data so that the zigzag stitch pattern is formed. When the push-button of the start switch 20 is pressed again, the microcomputer 64 makes a decision at step ST9 whether or not an operation signal PS-H is given. When the decision at step ST9 is "Yes", the microcomputer makes a decision at step ST14 whether or not the operating signal PS-H is given for a time of an odd ordinal number. When the decision at step ST14 is "No", the microcomputer 64 feeds a motor control signal MS to the motor driving circuit to stop the main motor 9, and then the motor driving circuit 88 stops the main motor 90 in response to the motor control signal MS.

Process for forming a buttonhole stitch pattern will be described hereinafter. First, the buttonholing presser foot 59 is attached to the presser bar 26, the detecting bar 58 is lowered from the head 18 to the lower position, and the stitch pattern selecting switch 34 is operated to select the button hole stitch pattern. Since the detecting bar 58 is lowered to the lower position, the position detector 60 gives a bar position detection signal LKS-H to the microcomputer 64. The microcomputer 64 executes the foregoing steps ST1 to ST8 to display the designation of the buttonhole stitch pattern on the character display unit 36 and, two seconds after the designation of the buttonhole stitch pattern has been displayed, the stitch pattern number of the buttonhole stitch pattern, an optimum swing stroke and an optimum feed stroke for the buttonhole stitch pattern are displayed on the character display unit 36.

When the push-button of the changeover switch 37 is pressed, a changeover signal KS-H is given to the microcomputer 64. Then, the microcomputer 64 executes steps ST10 to ST13. Consequently, a message explaining a preparatory operation necessary for forming the buttonhole stitch pattern, for example, "Set a button on buttonholing presser foot to stitch a buttonhole matching the button." Since the number of characters of this message exceeds the maximum display capacity of the character display unit 36, the message is rolled from right to left.

When the start switch 20 is operated to start the sewing machine, the microcomputer 64 makes decisions at steps ST9 and ST14 whether or not the operation signal PS-H is given for a time of an odd ordinal number When the decisions at steps ST9 and ST14 are "Yes", the microcomputer 64 makes a decision at step ST15 whether or not the stitch pattern code signal TS represents the buttonhole stitch pattern. When the decision at step ST15 is "Yes", the microcomputer 64 makes a decision at step ST18 whether or not a bar position detection signal LKS-H is given.

If the detecting bar 58 is not lowered from the head 18 to the lower position, the position detector 60 provides a bar position detection signal LKS-L. In such a case, the decision at step ST18 is "No". Then, the microcomputer 64 executes step ST19 and gives a display instruction signal DS to the read unit 82 to display a warning message expressing that the detecting bar 58 needs to be lowered to the lower position. Then, the read unit 82, the display information data memory 84 and the display driving circuit 86 function according to the display instruction signal DS to display a warning message, for example, "Down the detecting bar→" In this manner, the actuation of the main motor 90 is withheld when the start switch 20 is operated without lowering the detecting bar 58 from the head 18 to the lower position despite the selection of the buttonhole stitch pattern, and the warning message advising the operator to lower the detecting bar 58 to the lower position is displayed.

When the bobbin winder spindle 48 is positioned at the operative position to operate the bobbin winding device 46, the driven pulley 52 engages the hand pulley 42, and the bobbin winding spindle detector 56 gives a bobbin winding signal IKS-H to the microcomputer 64. Then, the microcomputer 64 makes a decision at step ST1 whether or not a bobbin winding signal IKS-H is given. When the decision at step ST is "Yes", the microcomputer 64 executes step ST20 to give a display instruction signal DS to the read unit 82, and then the read unit 82, the display information data memory 84 and the display driving circuit 86 function according to the display instruction signal DS to display a message, for example, "Bobbin winding mode" on the character display unit 36. In the bobbin winding mode, the bobbin winding signal IKS-H is provided, and hence another display instruction signal DS is not generated even if the stitch pattern selecting switch 34 and the changeover switch 37 are operated; the microcomputer repeats steps ST1 and ST20 to maintain the indication of the bobbin winding mode on the character display unit 26. When the start switch 20 is operated, the main motor 90 is actuated to drive the bobbin winding spindle 48 through the hand pulley 42 and the driven pulley 52, so that the thread is wound on a bobbin mounted on the bobbin winding spindle 48. In the bobbin winding mode where the bobbin winding device 46 is in the operative position, a clutch (not shown) disengages the hand pulley 42 from the main shaft 41.

Thus, in a special operating mode such as an operating mode where the bobbin winding device 46 is in the operative position and in an abnormal operating condition such as an operating condition where the detecting bar 58 is not lowered to the operative position despite the selection of the buttonhole stitch pattern, the special mode and the abnormal condition are displayed with preference to displaying information on the stitch pattern, so that the condition of the sewing machine can be discriminated instantly.

What is claimed is:

1. An information display for a zigzag sewing machine having a frame, a feed mechanism supported in said frame for selectively feeding a workpiece, a needle bar with a needle supported in said frame so as to be capable of endwise reciprocating and selectively lateral jogging, selecting means including selecting members to be operated for selecting a desired stitch pattern among a plurality of predetermined stitch patterns and adjusting means for setting at least either the amplitude of said needle for forming said selected stitch pattern or the feed of said feed mechanism for forming said selected stitch pattern, and being capable of forming a stitch pattern according to sewing conditions adjusted by said adjusting means, said information display comprising;

a display unit provided in a front side of said frame;

memory means for storing display information data comprising a first data for displaying optimum set values for each stitch pattern to be adjusted by said adjusting means and a second data for displaying messages relating to the selected stitch pattern explaining at least either sewing operation for forming said each stitch pattern or a method of forming said each stitch pattern;

a read means for reading said display information data for a selected stitch pattern from said memory means according to a code signal corresponding to said stitch pattern selected by said selecting means, and for supplying said data read to said display unit;

a changeover member for changing an information displayed on said display unit, provided in said front side of said frame; and sequence deciding means for deciding the sequence of supplying said first data and said second data, and for controlling said read means to read said first data in response to the operation of said selecting members, and to read said second data in response to the operation of said changeover member.

2. An information display for a zigzag sewing machine according to claim 1, wherein said sequence deciding means controls said read means to read either said first data or said second data from said memory means.

3. An information display for a zigzag sewing machine according to claim 1, wherein said sequence deciding means controls said read means to read said first data in response to the operation of said changeover member in case that said read means reads said second data.

4. An information display for a zigzag sewing machine having a frame, selecting means including selecting members to be operated for selecting a desired stitch pattern among a plurality of predetermined stitch patterns, and being capable of forming the stitch pattern selected by said selecting means, said information display comprising;

a display unit provided in a front side of said frame;

memory means for storing display information data comprising a first data for display identities for each stitch pattern to be selected by said selecting means and a second data for displaying messages relating to the selected stitch pattern explaining at least either sewing operation for forming each stitch pattern or a method of forming each stitch pattern;

read means for reading display information data for a selected stitch pattern from said memory means according to a code signal corresponding to said stitch pattern selected by said selecting means, and for supplying said data read to said display unit:

a changeover member for changing an information displayed on said display unit, provided in said front side of said frame; and sequence deciding means for deciding the sequence of supplying said first data and said second data, and for controlling said read means to read said first data in response to the operation of said selecting members and to read said second data in response to the operation of said changeover member.

5. An information display for a zigzag sewing machine according to claim 4, wherein said identity is a designation of said selected stitch pattern.

6. An information display for a zigzag sewing machine having a frame, a feed mechanism supported in said frame for selectively feeding a workpiece, a needle bar with a needle supported in said frame so as to be capable of endwise reciprocating and selectively lateral jogging, selecting means including selecting members to be operated for selecting a desired stitch pattern among a plurality of predetermined stitch patterns, adjusting means for setting at least either the amplitude of said needle for forming said selected stitch pattern or the feed of said feed mechanism for forming said selected stitch pattern, forming means for forming a stitch pattern according to sewing conditions adjusted by said adjusting means, and bobbin winding means for winding a bobbin thread on a bobbin, said information display comprising;

detector means for detecting an operative position of said bobbin winding means and generating a bobbin winding signal;

a display unit provided in a front side of said frame;

memory means for storing display information data comprising a first data for displaying optimum set values for each stitch pattern to be adjusted by said adjusting means, a second data for displaying messages relating to the selected stitch pattern explaining at least either sewing operation for forming said each stitch pattern or a method of forming said each stitch pattern, and a third data for displaying said bobbin winding means operation;

read means for reading said first data and said second data for a selected stitch pattern from said memory means according to a code signal corresponding to said stitch pattern selected by said selecting means, and for reading said third data from said memory means according to said bobbin winding signal, and for supplying said data read to said display unit;

a changeover member for changing information on said display unit, provided in said front side of said frame; and sequence deciding means for deciding the sequence of supplying said first data, said second data and said third data, and for controlling said read means to read said first data in response to the operation of said selecting members, and to read said second data in response to the operation of said changeover member, and to read said third data while said detector means detects said operative position of said bobbin winding means.

* * * * *